US009920635B2

(12) United States Patent
Bommisetty et al.

(10) Patent No.: US 9,920,635 B2
(45) Date of Patent: Mar. 20, 2018

(54) TURBINE BLADES AND METHODS OF FORMING TURBINE BLADES HAVING LIFTED RIB TURBULATOR STRUCTURES

(71) Applicant: HONEYWELL INTERNATIONAL INC., Morristown, NJ (US)

(72) Inventors: Ramakumar Venkata Naga Bommisetty, Karnataka (IN); Dhanvantri Joshi, Karnataka (IN); Sridhar Murari, Andhrapradesh (IN); Jong Liu, Scottsdale, AZ (US); Malak Fouad Malak, Tempe, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 733 days.

(21) Appl. No.: 14/480,968

(22) Filed: Sep. 9, 2014

(65) Prior Publication Data
US 2016/0069194 A1 Mar. 10, 2016

(51) Int. Cl.
*F01D 5/18* (2006.01)
*B23P 15/02* (2006.01)

(52) U.S. Cl.
CPC .............. *F01D 5/188* (2013.01); *B23P 15/02* (2013.01); *F01D 5/187* (2013.01);
(Continued)

(58) Field of Classification Search
CPC . F01D 5/18; F01D 5/181; F01D 5/185; F01D 5/186; F01D 5/187; F01D 5/188–5/189; F05D 2240/127; F05D 2260/2212; F05D 2260/22141; F28F 1/10; F28F 13/02; F28F 2215/00; F28F 2215/10; F28F 1/40; F28F 13/12;
(Continued)

(56) References Cited

U.S. PATENT DOCUMENTS

| 4,265,275 A | * | 5/1981 | Heller | F28F 1/40 138/38 |
| 4,352,378 A | * | 10/1982 | Bergmann | F28F 13/12 138/38 |

(Continued)

FOREIGN PATENT DOCUMENTS

EP   1533475 A2   5/2005

OTHER PUBLICATIONS

Extended EP Search Report for Application No. 15183522.0-1610/3006670 dated Jul. 4, 2016.
(Continued)

*Primary Examiner* — Christopher Besler
*Assistant Examiner* — Matthew P Travers
(74) *Attorney, Agent, or Firm* — Lorenz & Kopf, LLP

(57) ABSTRACT

The present disclosure provides various embodiments of cooling circuits, turbine blades with cooling circuits, and methods of forming such turbine blades, having raised rib turbulator structures, which may be used in gas turbine engines. In one exemplary embodiment, a cooling circuit for directing a flow of fluid is disclosed, the cooling circuit includes a cooling circuit wall and a plurality of raised turbulator ribs, each turbulator rib of the plurality of raised turbulator ribs being spaced apart from the cooling circuit wall to allow the fluid to flow between the cooling circuit wall and the plurality of turbulator ribs.

10 Claims, 7 Drawing Sheets

(52) U.S. Cl.
CPC ............. *F05D 2240/127* (2013.01); *F05D 2260/2212* (2013.01); *F05D 2260/22141* (2013.01); *Y02T 50/676* (2013.01)

(58) Field of Classification Search
CPC ........ B23P 15/02–15/04; Y02T 50/676; Y10T 29/49377; Y10T 29/49378; Y10T 29/49384; Y10T 29/49339; Y10T 29/49341
See application file for complete search history.

(56) References Cited

U.S. PATENT DOCUMENTS

| | | | |
|---|---|---|---|
| 4,407,632 A | 10/1983 | Liang | |
| 4,514,144 A | 4/1985 | Lee | |
| 5,156,526 A | 10/1992 | Lee et al. | |
| 5,165,852 A | 11/1992 | Lee et al. | |
| 5,193,980 A | 3/1993 | Kaincz et al. | |
| 5,472,316 A | 12/1995 | Taslim et al. | |
| 5,484,258 A | 1/1996 | Isburgh et al. | |
| 5,660,524 A | 8/1997 | Lee et al. | |
| 5,769,007 A * | 6/1998 | Tratz | C10B 1/10 110/229 |
| 6,099,252 A | 8/2000 | Manning et al. | |
| 6,126,396 A | 10/2000 | Doughty et al. | |
| 6,139,269 A | 10/2000 | Liang | |
| 6,168,381 B1 | 1/2001 | Reddy | |
| 6,190,129 B1 | 2/2001 | Mayer et al. | |
| 6,290,462 B1 * | 9/2001 | Ishiguro | F01D 5/187 416/97 R |
| 6,428,273 B1 | 8/2002 | Keith et al. | |
| 6,468,669 B1 | 10/2002 | Hasz et al. | |
| 6,471,479 B2 | 10/2002 | Starkweather | |
| 6,607,356 B2 | 8/2003 | Manning et al. | |
| 7,347,671 B2 | 3/2008 | Dorling et al. | |
| 7,544,044 B1 * | 6/2009 | Liang | F01D 5/188 416/96 R |
| 8,070,443 B1 | 12/2011 | Liang | |
| 8,360,630 B2 * | 1/2013 | Schneider | B01F 5/0619 366/337 |
| 2005/0281674 A1 | 12/2005 | Liang | |
| 2010/0221121 A1 | 9/2010 | Liang | |

OTHER PUBLICATIONS

Liou, T., et al.; Numerical Simulation of Turbulent Flow Field and Heat Transfer in a Two-Dimensional Channel with Periodic Slit Ribs; International Journal of Heat and Mass Transfer 45 (2002) 4493-4505.

Siw, S.C., et al.; Effects of Pin Detached Space on Heat Transfer in a Rib Roughened Channel; Journal of Turbomachinery; Copyright 2013 by ASME; Mar. 2014, vol. 135 / 021029-1.

Wang, J. et al.; Experimental Investigations on Overall Cooling Effect of Ribbed Channel With Air Bleeds; International Journal of Heat and Mass Transfer 55 (2012) 4800-4807.

* cited by examiner

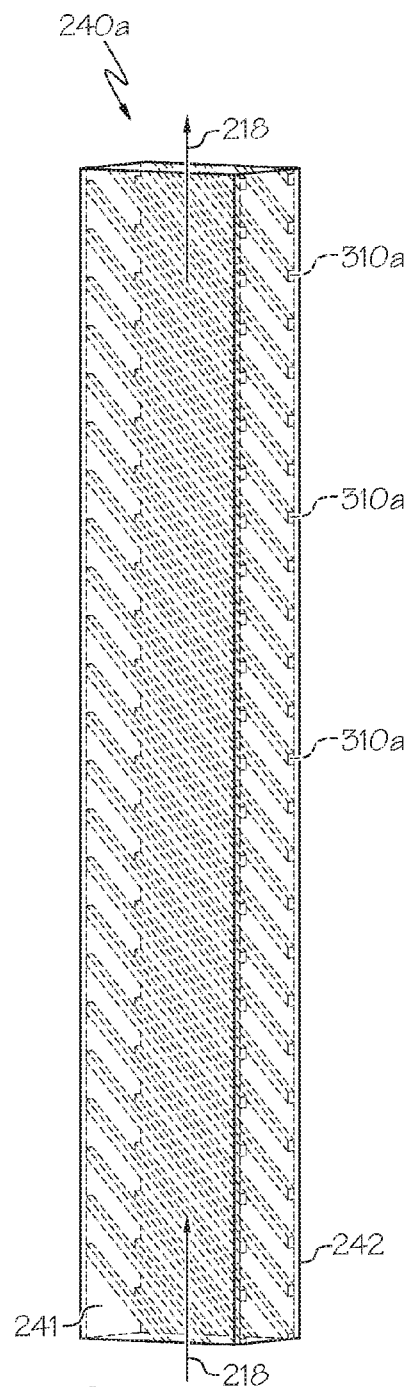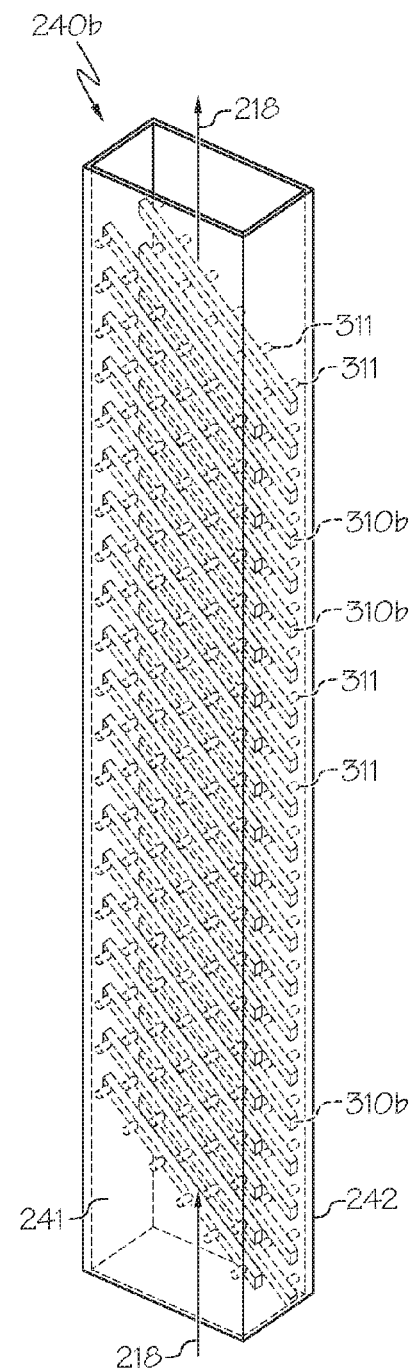
FIG. 4A (PRIOR ART)
FIG. 4B

TURBINE BLADES AND METHODS OF FORMING TURBINE BLADES HAVING LIFTED RIB TURBULATOR STRUCTURES

TECHNICAL FIELD

The inventive subject matter generally relates to gas turbine engines. More particularly, the inventive subject matter relates to turbine blades and methods of forming turbine blades having lifted rib turbulator structures for use in gas turbine engines.

BACKGROUND

Gas turbine engines, such as turbofan gas turbine engines, may be used to power various types of vehicles and systems, such as aircraft. Typically, these engines include turbines that rotate at a high speed when blades (or airfoils) extending therefrom are impinged by high-energy compressed air. Consequently, the blades are required to be able to transfer a significant amount of heat in order to maintain a suitable operating temperature.

For purposes of heat transfer, a blade cooling scheme is typically incorporated into the turbines. The blade cooling scheme is included to maintain the blade temperatures within acceptable limits. In some cases, the blade cooling scheme directs cooling air through an internal cooling circuit formed in the blade. The internal cooling circuit consists of a series of connected, serpentine cooling passages, which may incorporate raised or depressed structures therein. The serpentine cooling passages increase the cooling effectiveness by extending the length of the air flow path. In this regard, the blade may have multiple internal walls that form intricate passages through which the cooling air flows to feed the serpentine cooling passages.

Ribbed channels are widely used in the serpentine cooling passages of turbine blades. In this method of cooling, relatively cold air is forced through a series of passages with ribs and heat is extracted from the turbine blades. The cooling air is usually bled from high pressure compressor stages and reduces the core mass flow rates and thus a penalty on engine efficiency. Efficient methods of cooling with high heat transfer rates are required to minimize the coolant requirement.

As the desire for increased engine efficiency continues to rise, engine components are increasingly being subjected to higher and higher operating temperatures. However, current engine components, such as turbine blades, may not adequately transfer enough heat for operation at such higher operating temperatures. In particular, current turbine blades may be able to transfer enough heat to maintain a suitable operating temperature.

Accordingly, it is desirable to have an improved blade that may operate with improved durability when exposed to high engine operating temperatures. In addition, it is desirable to have an improved blade that is relatively simple and inexpensive to implement. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

The present disclosure provides various embodiments of cooling circuits, turbine blades with cooling circuits, and methods of forming such turbine blades, having raised rib turbulator structures, which may be used in gas turbine engines. In one exemplary embodiment, a cooling circuit for directing a flow of fluid is disclosed, the cooling circuit includes a cooling circuit wall and a plurality of raised turbulator ribs, each turbulator rib of the plurality of raised turbulator ribs being spaced apart from the cooling circuit wall to allow the fluid to flow between the cooling circuit wall and the plurality of turbulator ribs.

In another exemplary embodiment, an airfoil structure includes a pressure side wall, a suction side wall, and a dovetail base contacting with the pressure side wall and the suction side wall; a cooling circuit originating from the dovetail base and extending between the pressure side wall and the suction side wall; and a plurality of raising pins disposed along the side walls, wherein the raising pins comprise first and second ends, the first end being in direct contact with the side walls. Further, the airfoil structure includes a plurality of raised turbulator ribs, each such rib being connected to at least one of the raising pins at the second end thereof, the plurality of raised turbulator ribs being spaced apart from the side walls.

In yet another exemplary embodiment, a method for cooling a turbine airfoil structure includes the steps of providing a cooling circuit within the turbine airfoil structure, the cooling circuit comprising a cooling circuit wall, providing a plurality of raised turbulator ribs, each turbulator rib of the plurality of raised turbulator ribs being spaced apart from the cooling circuit wall, and directing a fluid flow over the plurality of raised turbulator ribs including between the cooling circuit wall and the plurality of turbulator ribs.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The inventive subject matter will hereinafter be described in conjunction with the following drawing figures, wherein like numerals denote like elements.

FIGS. 4A and 4B compare and contrast by side-view illustration cooling circuit turbulator ribs of the prior art (4A) and of the present disclosure (4B);

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
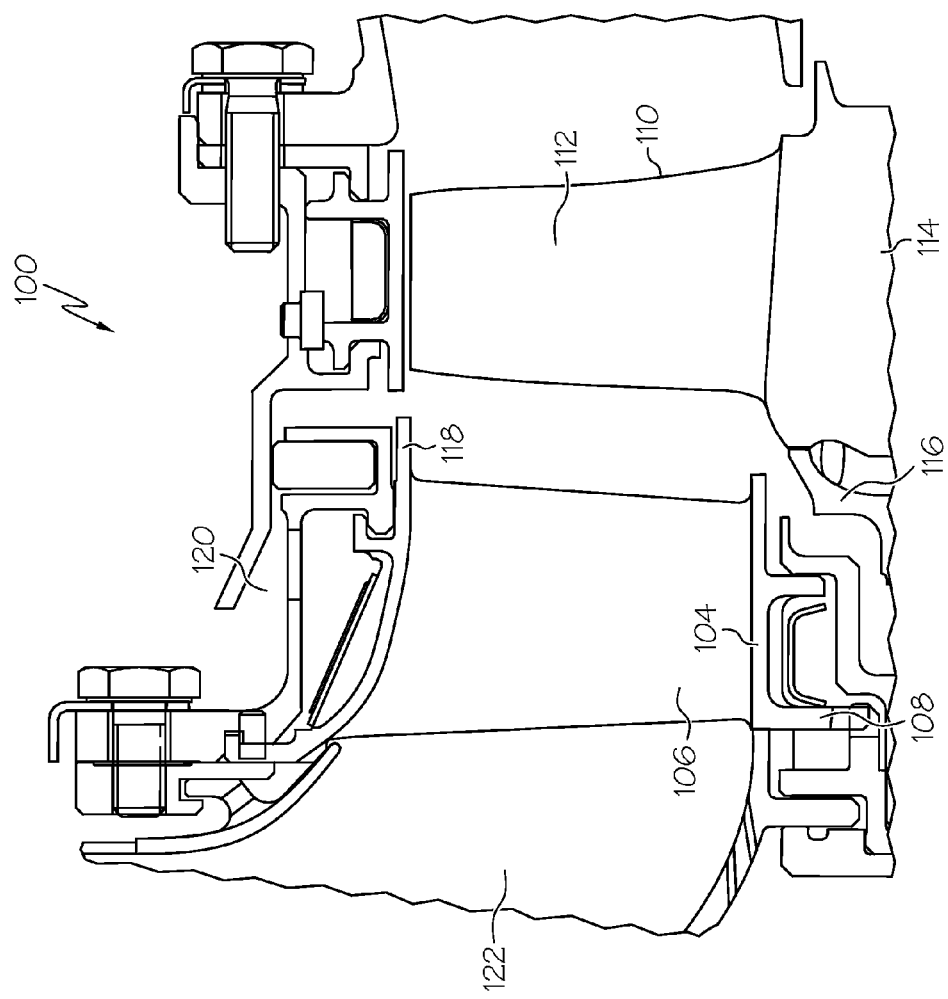
FIG. 1 is a cross-sectional side view of a turbine section of an engine, according to an embodiment.

FIG. 1 is a cross-sectional side view of a portion of a turbine section 100 of an engine, according to an embodiment. The turbine section 100 receives high temperature (e.g., temperature greater than 1100° C.) gases from an upstream engine combustor (not shown) to produce energy for the engine and/or components coupled to the engine. In an embodiment, the turbine section 100 includes a turbine nozzle 104 that has a plurality of static vanes 106 mounted circumferentially around a ring 108. The static vanes 106 direct the gases from the combustor to a turbine rotor 110. According to an embodiment, the turbine rotor 110 includes a plurality of blades 112 (only one of which is shown) that are attached to a hub 114 and retained in axial position by a retention plate 116. When the blades 112 are impinged upon by the gases, the gases cause the turbine rotor 110 to spin. According to an embodiment, an outer circumferential wall 118 surrounds the static vanes 106 and the plurality of blades 112 to define a flowpath 122. The circumferential wall 118 also defines a portion of a compressor plenum 120 that is disposed radially outwardly relative to the flowpath 122. The compressor plenum 120 receives bleed air from a compressor section (not shown), which may be directed through one or more openings in the outer circumferential wall 118 towards the plurality of blades 112 to cool the blades 112.

Figure 2:
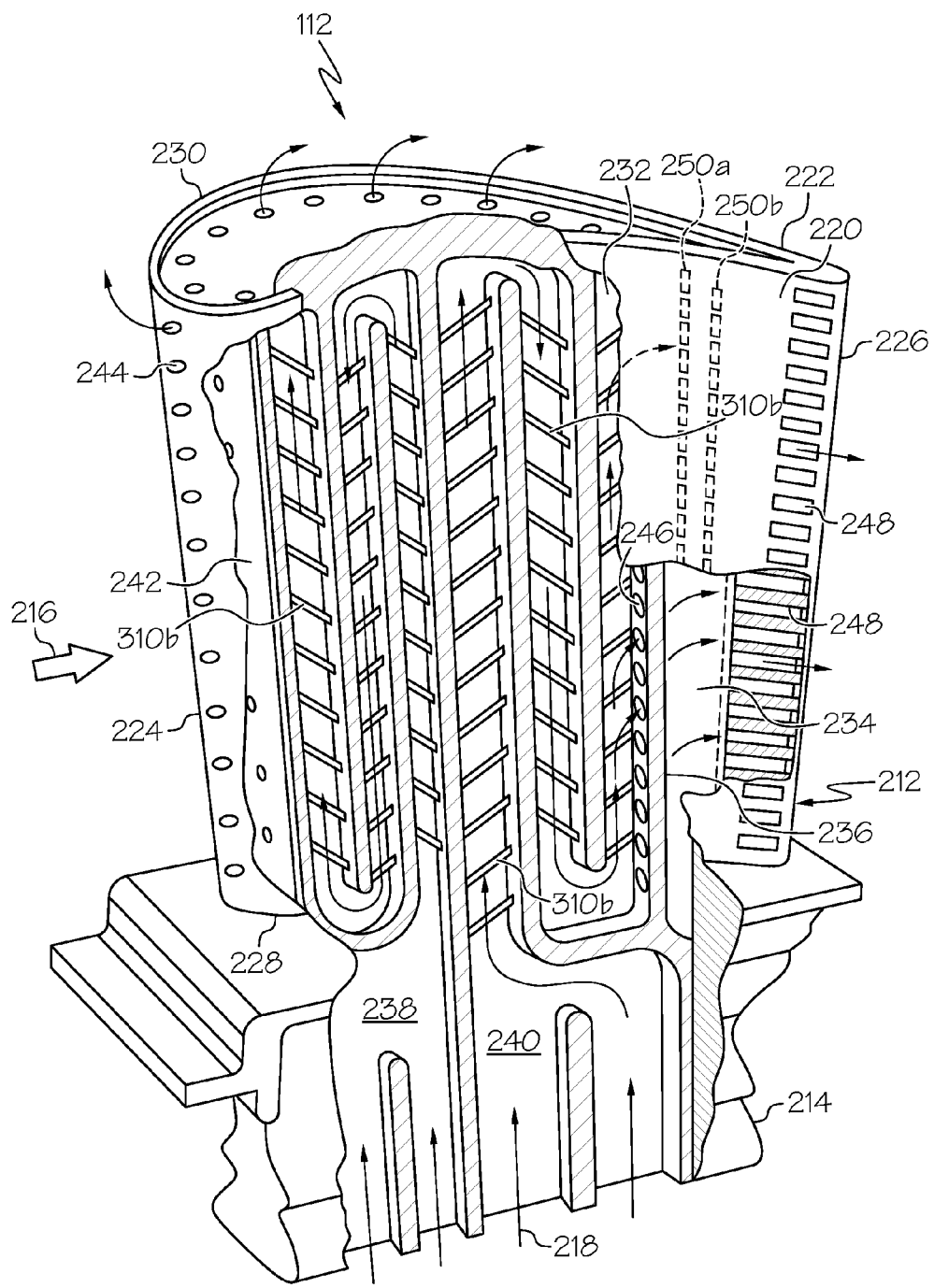
FIG. 2 is a perspective suction (convex) side view of an engine turbine rotor blade that incorporates an exemplary airfoil of the blade.

FIG. 2 illustrates an exemplary turbine rotor blade 112 of the gas turbine engine shown in FIG. 1, such as a turbofan aircraft engine configured for powering an aircraft in flight. The blade includes a hollow airfoil 212 and an integral dovetail 214 conventionally configured for mounting the blade in a corresponding dovetail slot in the perimeter of a turbine rotor (not shown). The airfoil is conventionally configured for extracting energy from hot combustion gases 216 which are channeled thereover during operation for in turn rotating the rotor to power the compressor. The airfoil is hollow and receives a portion of compressor air 218 through the dovetail for cooling the blade during operation and achieving a long useful life during operation.

The airfoil 212 illustrated in FIG. 2 includes a generally concave first or pressure sidewall 220 and a circumferentially opposite, generally convex, second or suction sidewall 222. The two sidewalls are joined together at axially or chordally opposite leading and trailing edges 224,226 which extend radially or longitudinally along the radial span axis of the blade inside the turbine. The airfoil has a radially inner root 228 at the junction with a platform integrally joined to the dovetail, typically in a unitary casting therewith. The airfoil also includes a radially outer tip 230.

As additionally shown in FIG. 2, the two sidewalls are spaced apart to define first and second longitudinally or radially extending flow channels 232,234 separated by a longitudinal septum or aft bridge 236 disposed in the trailing edge region of the airfoil. In the exemplary embodiment illustrated in FIG. 2, additional longitudinal flow channels are disposed between the two sidewalls 220,222 forward of the first and second flow channels 232,234, and correspondingly define forward and aft serpentine flow circuits 238,240 having corresponding inlets in the dovetail. Some configurations include a plurality of flow channels, which are referred to as serpentine configurations, whereas other configurations only include a single flow channel. Any such configuration will be appreciated as suitable for use in embodiments of the present disclosure.

The forward serpentine circuit 238 illustrated in FIG. 2 has three passes or flow channel legs beginning near the middle of the airfoil and winding toward the airfoil leading edge which includes a dedicated leading edge flow channel 242 directly behind the leading edge. The respective radial bridges defining the channels of the forward serpentine circuit are imperforate, except for the forward-most bridge which includes a row of impingement holes for discharging the cooling air from the last pass of the forward serpentine into the leading edge cooling channel 242.

The aft serpentine circuit 240 is also a three-pass circuit in which the legs or flow channels thereof are also defined by imperforate radial bridges, with the first pass of the aft serpentine similarly receiving its inlet air near the middle of the airfoil through the dovetail.

The forward and aft serpentine circuits and leading edge cooling channel have raised/lifted turbulator ribs therein as desired for increasing heat transfer effectiveness of the cooling air channeled therethrough. Greater detail regarding these raised/lifted turbulator ribs is provided in the following Figures. The pressure and suction sidewalls of the airfoil typically include various rows of film cooling holes 244 through which respective portions of the cooling air are discharged during operation for providing a cooling air film around the outer surface of the airfoil for additional protection against the hot combustion gases in a conventional manner.

In the exemplary embodiment illustrated in FIG. 2, the aft serpentine circuit 240 terminates with its last flow channel defining the first flow channel 232 for cooling the trailing edge region of the airfoil, with the air from the first channel 232 being in turn channeled or discharged into the second flow channel 234 of this trailing edge cooling circuit.

Figure 3A:
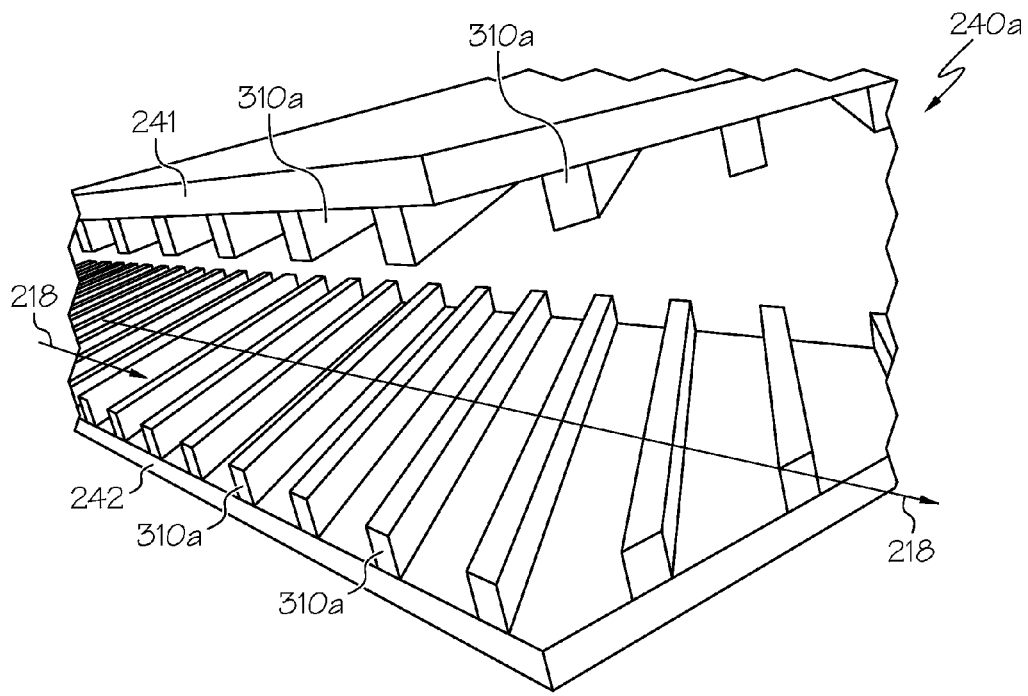
FIGS. 3A and 3B compare and contrast by perspective illustration cooling circuit turbulator ribs of the prior art (3A) and of the present disclosure (3B)
Figure 3B:
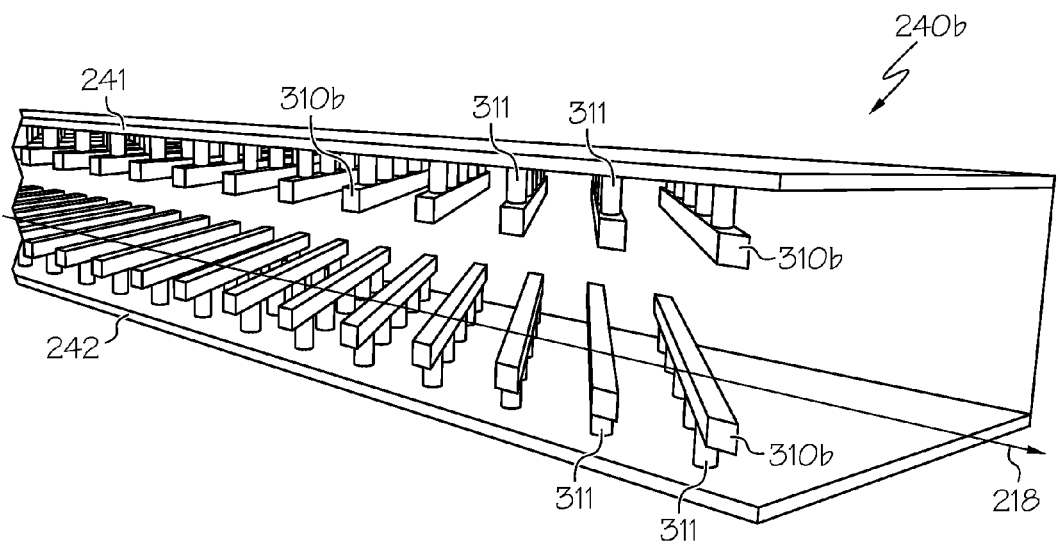

As noted above, the cooling circuits 238,240 have lifted turbulator features to increase the rate of heat transfer within the cooling circuit. FIGS. 3A and 3B provide a comparison between conventional turbulators as are known in the prior art and the lifted turbulators of the present disclosure. The turbulators of FIGS. 3A and 3B are presented in the exemplary environment of a cooling circuit, such as cooling circuit 240 of FIG. 2 (note that for purposes of differentiation, the cooling circuit is labeled 240a in FIG. 3A and 240b in FIG. 3B). As with FIG. 2, arrows 218 illustrate the direction of flow of cooling air through the circuit. First, in FIG. 3A, the conventional turbulator ribs 310a are oriented at about 45 degrees with respect to the flow of cooling air along both opposing walls 241,242 of the cooling circuit 240a. The turbulator ribs 310a have a generally rectangular configuration extending diagonally (with respect to the cooling air flow direction) along the respective walls 241, 242. The turbulator ribs 310a are generally parallel with respect to one another, and are spaced apart from one another by a distance of about 2 to about 10, such as about 4 to about 5 times the width of one of the turbulator ribs 310a.

In comparison, FIG. 3b illustrates the lifted turbulator ribs 310b of the present disclosure. The configuration of the ribs is generally as described above with regard to FIG. 3A (orientation, shape, etc.), except instead of extending along the respective walls 241,242, they are lifted above the surface of such walls by a plurality of raising pins 311. Each turbulator 310b includes a plurality of raising pins 311 along its length. The raising pins contact on one end thereof one of the walls 241,242, and on the other end thereof the lifted turbulator rib 310b. In this manner, the turbulator ribs are located fully apart from each wall 241,242, allowing cooling air 218 to flow thereunderneath. In some embodiments, the lifted turbulator ribs 310b are rectangular as shown in FIG. 3B, however in other embodiments, cylindrical, square, and other shapes, etc., may be employed. In some embodiments, the raising pins 311 are generally cylindrical in shape, as shown in FIG. 3B, however, in other embodiments, square, rectangular, and other shapes, etc., may be employed. Additionally, various numbers positions, and spacings of pins 311 and lifted turbulator ribs 310b may be employed, in contrast to the orientation and configuration shown in FIG. 3B. The lifted turbulator ribs 310b allow cooling air 218 to flow between the ribs 310b and the walls 241,242, as well as over the ribs 310b, the former of which not being possible in the conventional configuration shown in FIG. 3A.

FIGS. 4A and 4B provide side-view illustrations of the cooling circuits including turbulator ribs of FIGS. 3A and 3B, respectively. As can be seen, the ribs run generally at about 45 degree angles with respect to the cooling flow 218, and parallel to one another. In embodiments, the angle may be from about 30 degrees to about 90 degrees. In FIG. 4A, the ribs 310a are positioned directly along the walls 241, 242, such that no cooling air may flow between the ribs and the walls. In contrast, in FIG. 4B, the turbulator ribs 310b are lifted off of the walls 241,242 by the cylindrical pins 311 such that cooling air 218 is able to flow under the ribs 310b, thus increases the heat transfer from the walls 241,242, to the cooling air 218. In FIG. 4B, the raising pins 311 are spaced regularly along each rib 310b, and the ribs 310b are spaced regularly and parallel with respect to one another: however, in other embodiments, irregular spacing of the same is possible.

Figure 5:
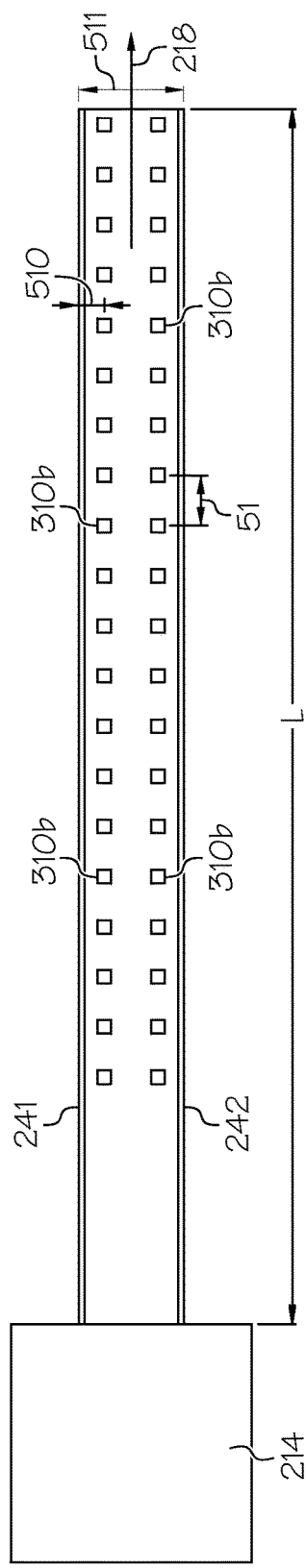
FIGS. 5 and 6 provide views of the lifted turbulator ribs cooling structures of the present disclosure, with FIG. 5 being a cross-section taken through the ribs, and FIG. 6 being a perspective view with the cooling circuit walls removed.
Figure 6:
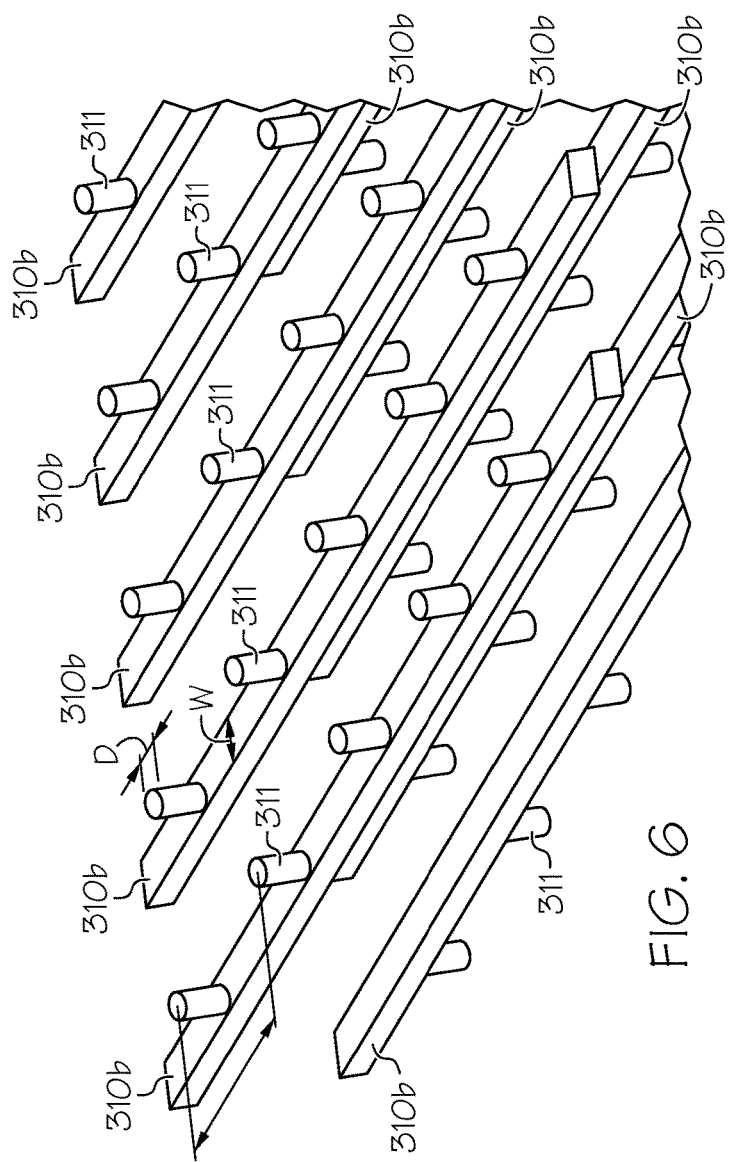
Figure 7A:
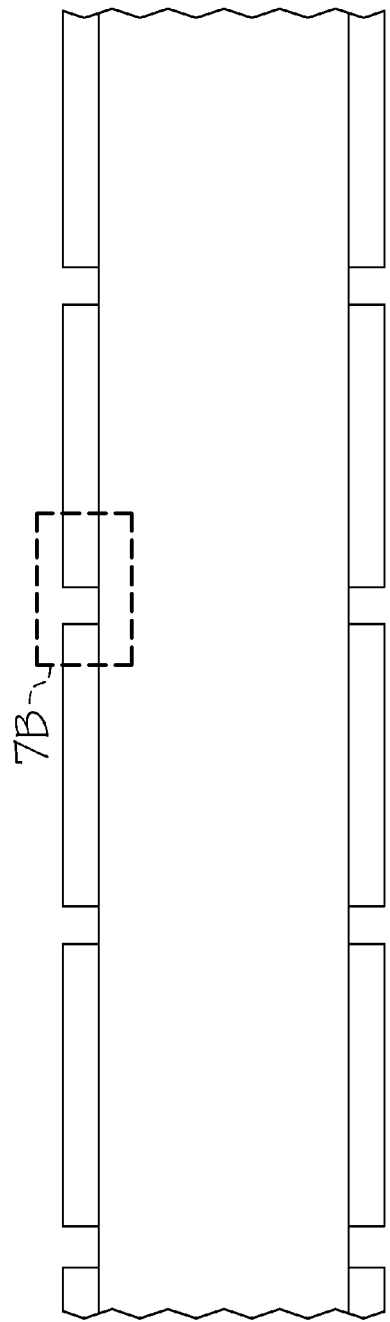
FIGS. 7A through 7D present computational fluid dynamics models of the velocity vectors of the cooling air flow 218 in conventional ribbed turbulator configurations (7A and 7B) and configurations in accordance with the present disclosure (lifted, 7C and 7D), with FIGS. 7B and 7D showing the velocity vectors of expanded portions of FIGS. 7A and 7C, respectively.
Figure 7B:
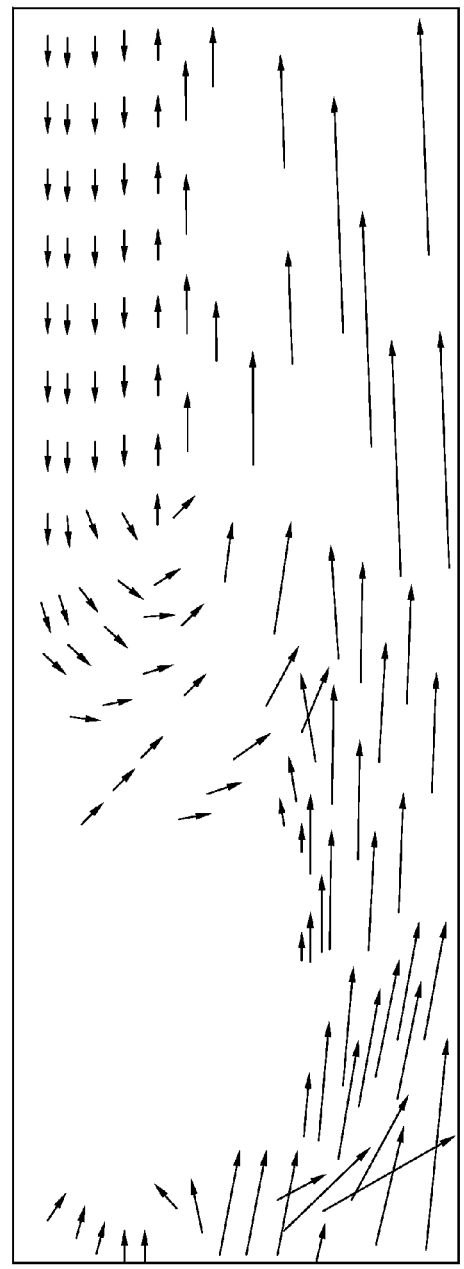
Figure 7C:
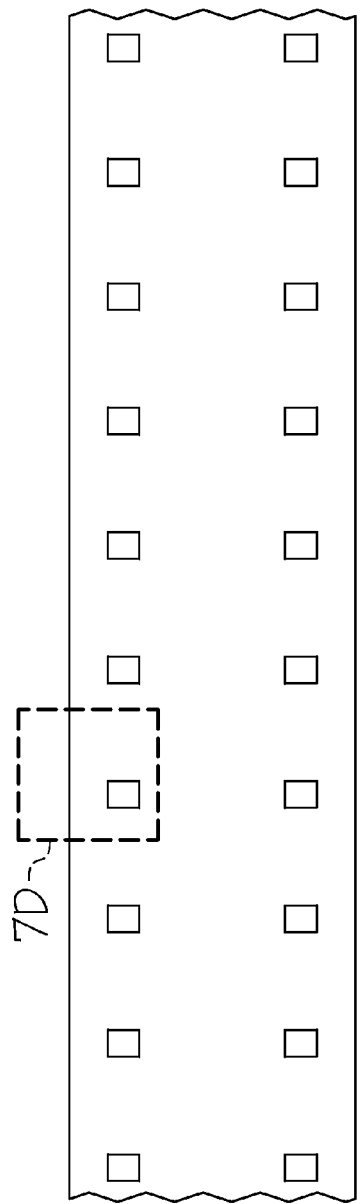
Figure 7D:
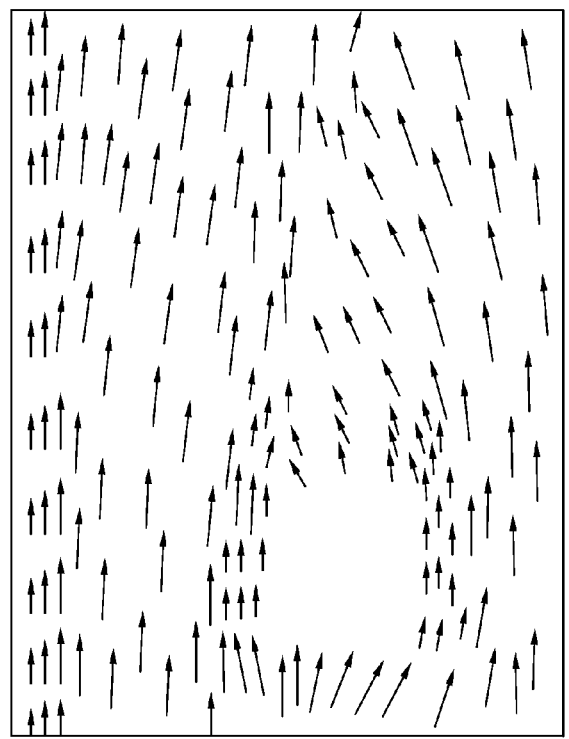

FIGS. 5 and 6 also provide views of the lifted turbulator ribs cooling structures of the present disclosure, with FIG. 5 being a cross-section taken through the ribs, and FIG. 3 being a perspective view with the walls 241,242 removed. With attention to FIG. 5, the relationship between the cooling circuit 240 and the dovetail 214 from which the cooling air 218 enters is made visible. The cooling air proceeds from the dovetail region 214 through the circuit 240, and is able to pass both over and under the lifted turbulator ribs 310b, which as clearly shown are lifted a distance 510 from the respective walls 241,242. The magnitude of distance 510 will greatly depend on the size of the cooling circuit itself, but may be from about 5% to about 50% of the (maximum) width 511 of the cooling circuit, for example from about 10% to about 30% of such width 511. The spacing $S_1$ between turbulator ribs may be about 3% to about 20% of the length L of one extension of the cooling circuit, from example from about 5% to about 10% of such length L. With attention to FIG. 6, the lifted turbulator ribs 310b and associated raising pins 311 are shown without the presence of walls 241,242. A spacing $S_2$ between pins 311 may be about 5% to about 50% of the total length of each rib 310b (best shown in FIG. 4B), from example from about 10% to about 30% of such length L. Further, a diameter D of the raising pins 311 may be set in close proximity to the width W of the lifted turbulator ribs 310b, for example from about 80% to about 120% thereof. Of course, other magnitudes of such distances as noted above are possible in other embodiments.

Turning now to the benefits of embodiments in accordance with the present disclosure, FIGS. 7A through 7D present computational fluid dynamics models of the velocity vectors of the cooling air flow 218 in conventional ribbed turbulator configurations (7A and 7B) and configurations in accordance with the present disclosure (lifted, 7C and 7D). As can been seen, the vectors in FIG. 7B, which is an expanded view of the channel shown in FIG. 7A (which itself does not illustrate the flow vectors) show vortices formed in front of the ribs 310a. In contrast, in FIG. 7D (which is an expanded view of the channel shown in FIG. 7C (which itself does not illustrate the flow vectors)), there are no such circulation zones using the lifted configuration 310b. Further, the lifted rib configuration of FIG. 7C, as illustrated best in FIG. 7D, helps in avoiding vortices formation and thereby so-called "blind-spots" of low velocity. Lifting of the ribs creates a nozzle effect locally at the ribs and thereby increase the velocity and reduces the boundary layer thickness.

Further, the Table below presents the results of a computational temperature distribution comparison between a conventional ribbed turbulator configuration and configurations in accordance with the present disclosure. As can be seen, it is clear that in the presently-disclosed embodiments, the cooling channel shows more heat gained by the coolant when compared with the conventional ribbed cooling channel. Still further, the Table presents a computation heat transfer rate distribution comparison between a conventional ribbed turbulator configuration and configurations in accordance with the present disclosure. As demonstrated, heat transfer rate in the raised configuration is about 31.5% more than conventional rib configuration. For the same wall temperature of 1200 K or 2160 R, coolant exit temperature is higher for lifted ribs. The Table thus indicates coolant is able to take more heat in raised rib configurations. Additionally, as shown in the Table, the addition of the raised turbulators does not result in any significant increase in pressure loss as compared to the conventional ribbed channel configurations.

TABLE

|  | SMOOTH CHANNEL | CONVENTIONAL RIBBED CHANNEL | LIFTED RIB CHANNEL |
| --- | --- | --- | --- |
| REYNOLDS NUMBER | 15000 | 15000 | 15000 |
| Coolant Entry Temperature | 800 K or 1440 R | 800 K or 1440 R | 800 K or 1440 R |
| Coolant Exit Temperature | 858.97 K or 1546.146 R | 951.054 K or 1711.8972 R | 999.37 K or 1798.866 R |
| Temperature Rise | 58.97 K or 106.146 R | 151.054 K or 271.8972 R | 199.37 K or 358.866 R |
| Pressure In (Psi) | 150.292454968 | 150.877392164 | 151.510336852 |
| Pressure Out (Psi) | 150 | 150 | 150 |
| Heart Transfer Rate (W) | 50.038 | 128.587 | 169.173 |
| % Heat gain by Keeping Conventional Ribbed Channel as Base Case |  |  | 31.56 |

TABLE-continued

|  | SMOOTH CHANNEL | CONVENTIONAL RIBBED CHANNEL | LIFTED RIB CHANNEL |
|---|---|---|---|
| % Pressure Loss by Keeping Conventional Ribbed Channel as Base Case |  |  | 0.419 |

Accordingly, the disclosed lifted turbulator rib configuration enhances the heat transfer rates from blade to cooling air, and thereby reduces the cooling air flow requirement and ultimately increases the engine efficiency. The lifted turbulator rib configuration is found to help modify the flow behavior in the cooling circuit and thereby increase heat transfer rates.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A turbine airfoil structure comprising:
  a pressure side wall, a suction side wall, and a base contacting with the pressure side wall and the suction side wall;
  a cooling circuit originating from the base and extending between the pressure side wall and the suction side wall;
  a plurality of raising pins disposed along either or both of the pressure and suction side walls, wherein each of the plurality of raising pins comprises an axial first end and an axial second end, each such first end being in direct contact with one of the pressure and suction side walls; and
  a plurality of raised turbulator ribs, each turbulator rib of the plurality of turbulator ribs being connected to at least one of the plurality of raising pins at the second end of the at least one of the plurality of raising pins, each turbulator rib of the plurality of raised turbulator ribs being spaced apart from both of the pressure and suction side walls.

2. The turbine airfoil structure of claim 1, wherein each pin of the plurality of raising pins is spaced regularly and parallel with respect to one another.

3. The turbine airfoil structure of claim 1, wherein each turbulator rib of the plurality of raised turbulator ribs is directly connected to at least two raising pins of the plurality of raising pins.

4. The turbine airfoil structure of claim 1, wherein at least one raising pin of the plurality of raising pins comprises a cylindrical configuration.

5. The turbine airfoil structure of claim 1, wherein a spacing between each pin of the plurality of raising pins along one turbulator of the plurality of raised turbulators is 5% to 50% of a total length of the one turbulator.

6. The turbine airfoil structure of claim 1, wherein the cooling circuit encloses a volume and comprises a width that is perpendicular with respect to a direction of the flow of fluid, and wherein a separation distance of the plurality of raised turbulator ribs from the side walls is 5% to 50% of the width of the cooling circuit.

7. The turbine airfoil structure of claim 1, wherein each rib of the plurality of raised turbulator ribs has a width, and wherein each rib of the plurality of raised turbulator ribs is spaced apart from one another by a distance that is two to ten times the width of each rib of the plurality of raised turbulator ribs.

8. The turbine airfoil structure of claim 1, wherein the plurality of raised turbulator ribs are oriented at 30 degrees to 90 degrees with respect to a direction of the flow of fluid.

9. The turbine airfoil structure of claim 1, wherein the cooling circuit comprises a serpentine configuration comprising a plurality of circuit extension portions, and wherein a spacing between each turbulator rib of the plurality of raised turbulator ribs is 3% to 20% of a length of one circuit extension portion of the plurality of circuit extension portions.

10. A gas turbine engine comprising the turbine airfoil structure of claim 1.

* * * * *